Patented Jan. 2, 1951

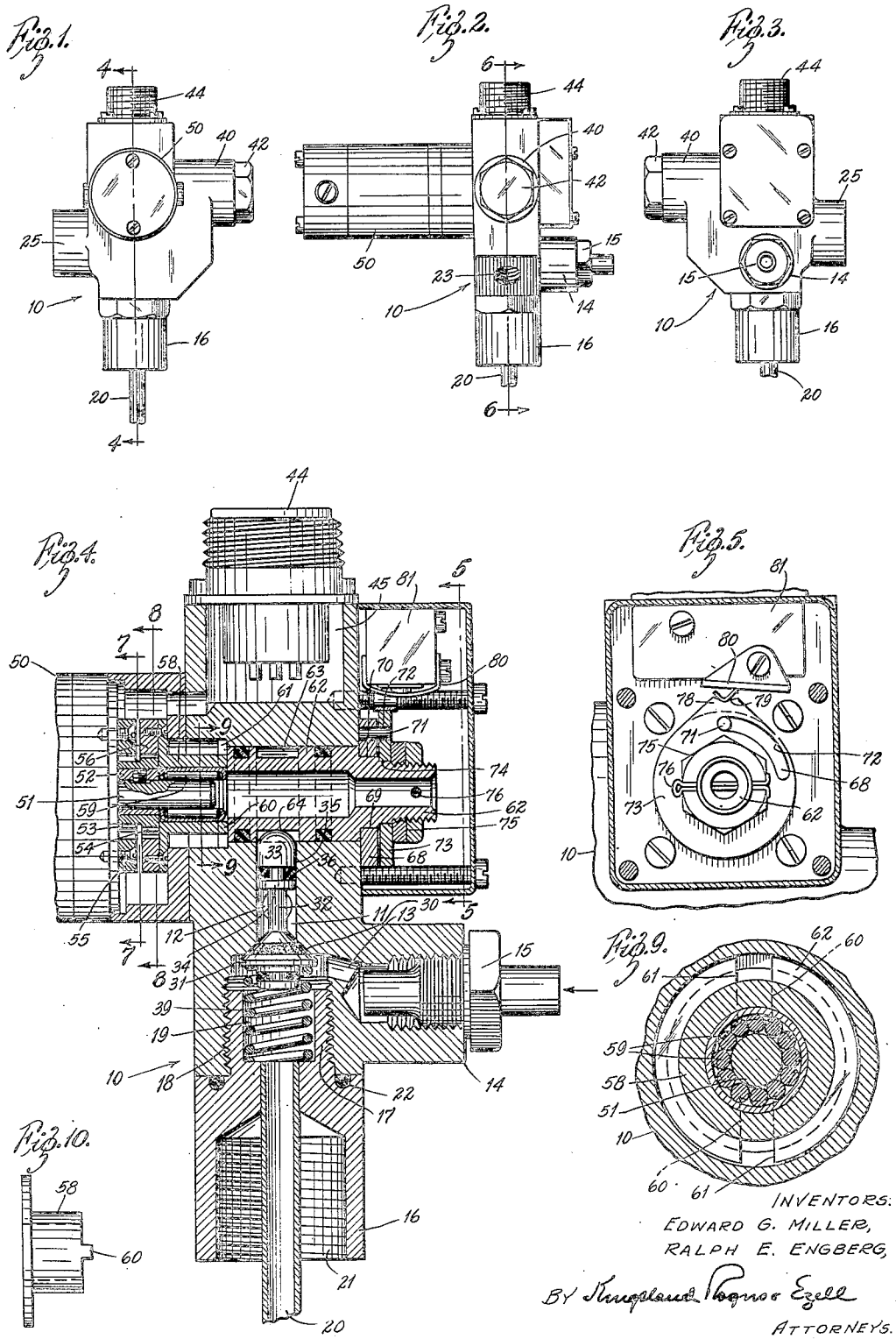

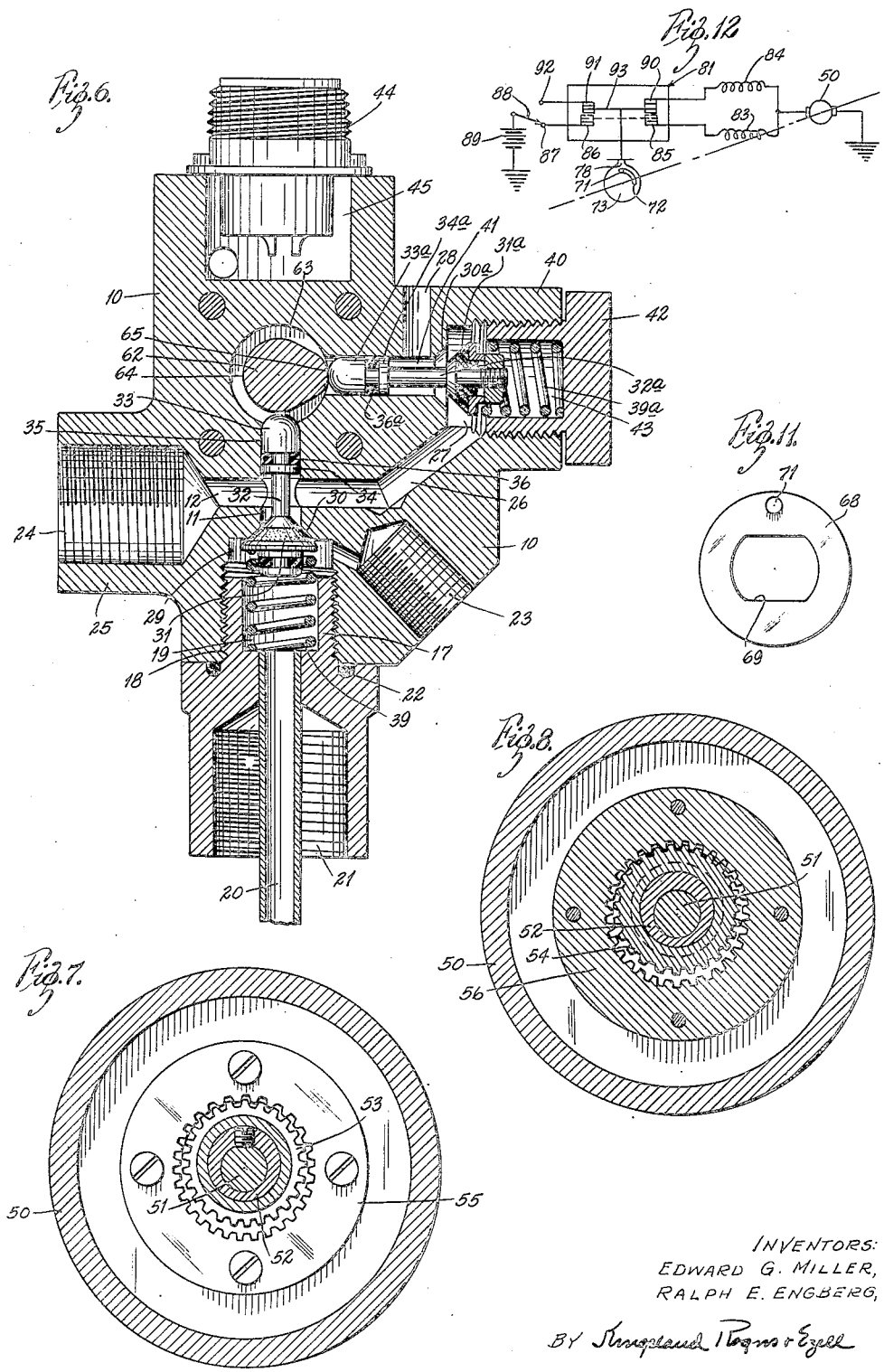

2,536,691

UNITED STATES PATENT OFFICE 2,536,691

THREE-WAY MOTOR OPERATED VALVE

Edward G. Miller and Ralph E. Engberg, Clayton, Mo., assignors to Alco Valve Company, Maplewood, Mo., a corporation of Missouri Application March 25, 1943, Serial No. 480,484

13 Claims. (Cl. 137—144)

1

This invention relates to motor operated valves, and consists in the novel construction hereinafter disclosed.

An object of the invention is the provision in a valve of this type of an improved operating connection between the valve mechanism and the prime mover, whereby a high velocity speed reduction ratio in the connection is developed, resulting in a substantially improved operating torque for operating the valve mechanism.

Another object of the invention is the provision of an improved automatic control for the valve operating mechanism, whereby an electrical circuit is controlled by a limit switch, and the operating circuit thereby rendered self-phasing so that regardless of the valve setting in either extreme position, the circuit will be set to operate to move the valve to the other direction when the circuit is externally operated.

Another object is to generally simplify the construction of a valve of this type to provide a compact, light weight and relatively small mechanism, without sacrificing efficiency and accuracy of operation.

Additional advantages of the invention will be apparent from the following detailed description taken in connection with the accompanying drawings, in which:

Fig. 1 is an end view of the valve mechanism;

Fig. 2 is a side elevation of the same;

Fig. 3 is an end view of the end of the mechanism opposite to that illustrated in Fig. 1;

Fig. 4 is a vertical section taken substantially on the line 4—4 of Fig. 1;

Fig. 5 is a vertical section taken substantially on the line 5—5 of Fig. 4;

Fig. 6 is a vertical section taken substantially on the line 6—6 of Fig. 2;

Fig. 7 is a vertical section taken substantially on the line 7—7 of Fig. 4;

Fig. 8 is a vertical section taken substantially on the line 8—8 of Fig. 4;

Fig. 9 is a fragmentary section on the line 9—9 of Fig. 4;

Fig. 10 is a detail view in side elevation of a cam key, a part of the valve operating assembly;

Fig. 11 is a detail view of a part of the limit switch operating mechanism; and, Fig. 12 is a wiring diagram of the electrical control circuit for the motor element.

In the embodiment of the invention illustrated in the drawing, the mechanism is shown as including a valve body 10, having formed therein an inlet passage 11, and an outlet passage 12. The valve body is also provided with a filler

2 passage 13 having its inlet part extending into a hollow threaded boss 14 formed integral with the valve body 10. An internally opening check valve 15 is threaded into the hollow boss 14 and is adapted to permit an inflow into the passage 13, but to prevent exhaust therefrom.

While the mechanism has varied applications, the valve is shown equipped for application as a control of an air bottle (not shown). To this end the valve body has threaded into one wall thereof a nipple 16, having an externally threaded extension 17 that threads into a threaded opening 18 in the valve body 10, in axial alinement with the inlet passage 11. The nipple 16 has an internal recess 19 in its upper face (Fig. 4) into which is fitted a siphon tube 20 adapted to extend into an air bottle, to which the valve may be connected by threading a threaded recess 21 of the nipple 16 over a complementary threaded connection of the air bottle as will be readily understood. A gasket 22 may be employed if desired to seal the joint between the nipple 16, and the opening 18 in the valve body if desired. The valve body is also provided with a threaded recess 23 (Fig. 6) that communicates with the inlet passage 11. The recess 23 is adapted to receive in threaded engagement a conventional pressure gage device (not shown).

The outlet passage 12 enters into a threaded recess 24, formed in a boss 25 integral with the valve body 10. This construction provides for connecting the outlet of the valve with a service conduit (not shown). The inner end of the passage 12 connects into a branch passage 26 that leads into a valve chamber 27, that communicates with an open exhaust passage 28 in the valve body.

It will be understood that the inlet passage 11 intersects and is in communication with the outlet passage 12 when the valve mechanism is in open adjustment, and that the outlet passage 12 via the passage 26, the valve chamber 27, and the exhaust passage 28 is in communication with atmosphere when the valve mechanism is in closed adjustment.

The inlet part or influent end of the passage 11 is controlled by a poppet valve operating in a valve chamber 29, against a conical valve seat 30 formed at the orifice of the passage 11.

The poppet valve structure comprises a conical valve plug 31, having a resilient sealing surface to contact the valve seat 30. A valve stem, including reduced part 32, a hemispherical head 33, and an annular flange 34, operates and is guided in a radial bore 35 formed in the valve body. A sealing gasket 36 is interposed between the flange 34 and under the face of the head 33 of the valve stem, and serves to seal the bore 35 in which the valve operates. The poppet valve is actuated to its seat to close the inlet passage by an expansion spring 39 seated in the recess 19. It is actuated to open position by the motor driven mechanism, later to be described.

The passage of fluid from the valve chamber 27 into the discharge passage 28 is controlled by a similar poppet valve mechanism to that just described. It will, therefore, be unnecessary to repeat the description, as the similar parts are indicated by duplicated and corresponding reference numerals, with the added suffix a.

The exhaust valve is positioned at right angles to the inlet valve. It is mounted in an internally threaded hollow boss 40 formed integral with the valve body. An internal radial bore 41 is formed in the valve body and the valve stem of the poppet valve is slidably mounted therein. An externally threaded nut 42, having an internal recess 43 constitutes a spring seat for the spring 39a. The tendency of the spring is to actuate the valve plug 31a to its seat thereby closing communication between the passage 26 and the exhaust passage 28. The valve is opened by the mechanism later to be described.

A suitable electric wiring connector 44 is partially contained within a recess 45 in the top wall of the valve body.

The means for operating the two valves includes a reversible motor, the casing of which is shown at 50. This motor rotates a shaft 51. An eccentric 52 (Figs. 4, 7, 8) is secured to this shaft to rotate therewith. Around this eccentric is mounted a double pinion mechanism, including a first pinion 53 and a second pinion 54. When the eccentric 52 is rotated by the shaft 51, these two pinions may revolve about the eccentric.

A first ring gear 55 is secured to the motor housing. The pinion 53 is supported concentrically of the eccentric 52. It is smaller than the ring gear, and, consequently, it is caused by the eccentric 52 to walk around the ring gear, which action gives the pinion 53 a rotation about its own axis. This rotation is transmitted to the pinion 54, which is integral with the pinion 53.

The pinion 54 meshes with a movable ring gear 56, the engagement being similar to that between the pinion 53, and the ring gear 55. The ring gear 56 comprises the driven member of the epicyclic train. It is driven at a very much reduced speed relative to that of the shaft 51.

The ring gear 56 is mounted upon a rotary member 58 (Figs. 4, 9, and 10). The rotary member 58 is mounted about the motor shaft 51 with a roller bearing 59 between them. The inner end of the rotary member is provided with tongues 60 that engage within slots 61 across the head of a cam member 62. This cam member is inserted into a passage 63, extending transversely of the valve body. The head of the cam member 62 is enlarged to fit within the enlarged end of the opening 63 to limit movement of the member 62 through the valve body as is shown in Figs. 4 and 9.

Thus, it will be seen that the motor shaft 51 will rotate the rotary member 58 through the epicyclic train, and, in turn, the rotary member by engagement of the tongues 60 in the slot 61 will rotate the cam member 62 within the opening 63.

The middle portion of the cam member 62 is eccentrically grooved to provide a cam portion 64 (Fig. 6). The portion 64 is engaged by the heads 33 and 33a of the two valves 31 and 31a. As appears from Fig. 6, a 90° rotation of the member 64 will cause the camming portion 65 to release one valve and to open the other.

The mechanism for controlling the direction of rotation of the reversible motor 50 includes a mechanism attached to the right-hand end (Fig. 4) of the cam member 62. The first element of this mechanism is a disc 68 (Figs. 4 and 11). This disc has a non-circular opening 69 therein by means of which it may be non-rotatably supported upon a portion 70 of the cam member 62. A pin 71 is eccentrically supported on the disc 68. This pin engages within an arcuate slot 72 (Fig. 5) in a limit switch cam 73 that is rotatably mounted upon a shoulder 74 on the member 62. A nut and lock nut, both generally indicated at 75, are tightened onto a threaded end of the member 62 to hold the cam 73 against removal from the member 62, but they do not prevent free rotation of the cam on the member. A cotter key 76 may be added for locking purposes.

It may be seen that the pin 71 will be rotated upon rotation of the motor shaft with a lost motion in the slot of almost 90°, at the ends of which lost motion, further displacements of the pin 71 will move the cam 73.

The cam member 73 has a rise 78 on it, the top 79 of which is notched (Fig. 5). The rise engages a projecting leg of a trigger member 80 of a limit switch 81. This limit switch is of a commercial type with single-pole double-throw snap-action operation. When the cam is in the position of Fig. 5, the limit switch closes one circuit and opens another. When the cam removes the rise 78 from the trigger member 80, the limit switch trigger 81 is pivoted downwardly to shift the limit switch to open the first circuit and to close the second.

A typical electrical circuit for the valve is shown in Fig. 12. The motor 50 is shown as having a forward winding 83 and a reverse winding 84. The winding 83 is connected to a contact 85, the circuit of which may be completed through another contact 86 that is connected to a terminal 87 of a master switch 88. The master switch 88 is in turn connected to a battery 89. The circuit may be completed through the ground.

The reverse winding 84 is connected to a contact 90 that may be closed with the contact 91 connected to another terminal 92 of the master switch 88.

The limit switch arm 93 is displaced by the cam 73 from a position wherein it closes the contacts 90 and 91 to a position wherein it closes the contacts 85 and 86.

*Operation*

As heretofore noted, this valve may be used as a means to control the storage of air, its use to do work, and the exhaust of air from the work. To this end, the inner check valve 15 may be connected to a source of compressed air. The nipple 21 may be connected to a bottle, or like storage container, for air. And the nipple 24 may be connected to an airline to the work.

When it is desired to recharge the bottle, the motor 50 is operated to put the valves in the position of Figs. 4 and 6. In this position, the valve 31 is closed, and the valve 31a is open. Air is introduced then through the valve 15, whence it passes through the passage 13 and the tube 20 into the bottle. It is prevented from escaping because the valve 31 is closed.

Meanwhile, the work is connected to exhaust from the nipple 24 through the passages 12 and 26 around the valve 31ª to the exhaust port 28, thus relieving any back pressure at the work.

In the foregoing position of the valves, the circuits of the device will be as shown in Fig. 12. When it is later desired to use the air stored in the bottle to perform the work, the switch 88 is moved into the dotted line position of Fig. 12, closing with the contact 92. In this position, the circuit is completed through the limit switch contacts 90 and 91, and the reverse winding 84 of the motor. The motor then rotates the cam member 62 counterclockwise in Fig. 6 so that the cam rise 65 moves approximately 90° to release the valve 31ª to closed position and thereafter to open the valve 31.

During the first part of this movement, as will be seen by comparing Figs. 5 and 6, the disc 68 will move the pin 71 within the slot 72 without displacing the cam 73. Consequently, the limit switch will not be shifted until the end of the movement of the member 62. Just prior to 90° displacement of the member 62, the pin 61 will reach the end of the slot 72, so that further movement of the member 62 and the disc 68 will cause the cam 73 to be displaced, removing the rise 78 from the trigger 80, thus causing the limit switch to shift to the contacts 85 and 86 as shown in dotted lines in Fig. 12.

Premature displacement of the cam 73 is prevented by the fact that the trigger 80 engages within the groove 79 of the cam 73 to offer some resistance to displacement of the cam 73, which resistance is greater than the friction that would tend to cause the cam to follow movements of the disc.

Shifting of the limit switch opens the circuit through the master switch 88 and causes the motor shaft to stop with the cam 90° from the position of Fig. 6, so that the valve 31 is open and the valve 31ª is closed. In this position, the check valve 15 prevents escape of air from the bottle, but air from the bottle can pass around the valve 31 and out through the passage 12 to the work. It is cut off from exhaust by the closure of the valve 31ª.

A subsequent shifting of the switch 88 to the dotted line position of Fig. 12 will reclose the motor circuit, but this time through the winding 84. Thereupon the cam member 62 will shift to return the valves to the positions of Fig. 6. During the early part of this movement, the pin 71 will again go through almost 90° of lost motion. Finally, it will reach the end of the slot 72 to force the rise 78 under the trigger 80 and shift the limit switch to the dotted line position of Fig. 12 so that it opens the motor circuit. In this operation, again, the resistance of the limit switch to displacement is such as to prevent premature movement of the cam 73 under the limit switch by friction or like forces transmitted from the disc 68.

The valve also will permit a direct connection of the air under pressure to the work when the valve 31 is open and the valve 31ª is closed, in which case, the air under pressure will flow through the portion 18 and around the valve 31 to the work.

The port 30 will be attached to a gage to indicate at all times the air pressure.

It will be seen that this valve construction is self-phasing since the position of the limit switch relative to the valves is fixed, both being operated off the same cam member 62. Consequently, if the valve is manually moved, the limit switch will shift the same as if the valve had been automatically moved by the motor. Manual movement might be resorted to upon failure of power. Upon return of power after manual movement, the mechanism will be phased to operate the valves from the positions to which they have been manually moved.

What is claimed is:

1. In a valve mechanism, a housing, an operated device operable therein from open to closed position, a reversible motor for operating the device, a limit switch operable from a forward position to a reverse position, said limit switch in forward position closing in a forward motor circuit, and in reverse position closing in a reverse motor circuit, and being thereby adapted to control the direction of rotation of the motor, means to operate the operated device from the motor and means to operate the limit switch from the motor, said last-named means including a lost motion connection between the motor and the limit switch actuating means whereby the motor may be operated in either direction a predetermined distance to operate the device and then may shift the limit switch to stop the motor and to preset the limit switch circuit for operation of the motor in the other direction.

2. A valve operating means including a housing, a pair of operated devices therein having spaced actuating means, a motor for operating the devices, means between the motor and the operating means for operating one device and releasing the other device when the motor moves back or forth between two limitations of its operation, a limit switch operable to a first position in which it may effect forward rotation of the motor and into a second position in which it may effect reverse rotation of the motor, a member for actuating the limit switch, and a lost motion connection between the motor and the member to cause the motor to rotate from a position wherein it causes one device to be operated, to a position wherein it causes the other device to be operated, and then to stop.

3. A mechanism of the kind described including a pair of operable devices, each having an actuating means and each movable to first and second positions, said actuating means being angularly spaced apart, a reversible motor, a rotatable member rotated by the motor from a position in which it moves the first device from first to second position and releases the second device, to a position wherein it moves the second device to its second position and releases the first device to its first position, limit switch means movable from a position to effect rotation of the motor in one direction to a position to effect rotation of the motor in the other direction, a cam rotatably mounted on the rotating member and adapted to actuate the limit switch means to one position or to release it to the other position, a lost motion connection between the cam and the rotating member adapted to provide rotation of the rotating member from a position wherein one of the devices is released to its first position and the other is moved to its second position to a position wherein said one device is moved to its second position and the other is released, and then to displace the limit switch cam to cause it to shift the motor circuit.

4. In a housing, a first actuated device, a second actuated device angularly spaced from the first, a cam means operable from a position in which it displaces the first device and releases the second device, to a position in which it releases the first device and displaces the second, a reversible motor for rotating the cam, a limit switch operable from a position to effect forward rotation of the motor to a position to effect reverse rotation of the motor, a second cam rotatably mounted relatively to the first cam, said second cam being operable from a position to move the limit switch to one of its circuits to a position to release the limit switch to its other circuit, and a lost motion connection between the first cam and the second cam so that the second cam is not displaced upon rotation of the first cam until the first cam has moved substantially from a position to displace one device to a position to displace the other.

5. In a valve mechanism, a housing, a motor having a shaft connected into the housing, a transverse opening through the housing with which the motor shaft is alined, a rotatable cam member within the transverse opening, a plurality of actuated devices radially disposed with respect to said member and adapted to be operated by the same upon its rotation, said transverse opening being adapted to receive the rotary member from one end of said opening, means to prevent axial movement of the rotating member within the opening, a member separable from the rotating member and adapted to be interposed between the motor shaft and the rotating member to transmit rotation of the shaft to the member, and interengaging means between the separable member and the rotating member, being adapted to transmit torque, but being disengageable by axial movement thereof away from the rotating member.

6. In a valve mechanism, a housing, a motor having a shaft connected into the housing, a transverse opening through the housing with which the motor shaft is alined, a rotatable cam member within the transverse opening, a plurality of actuated devices radially disposed with respect to said member and adapted to be operated by the same upon its rotation, said transverse opening being adapted to receive the rotary member from one end of said opening, means to prevent axial movement of the rotating member within the opening, means including an epicyclic gear train and a member rotated by the train, separable from the rotating member and adapted to be interposed between the motor shaft and the rotating member to transmit rotation of the shaft to the member, and interengaging means between the separable member and the rotating member, being adapted to transmit torque, but being disengageable by axial movement thereof away from the rotating member.

7. In a valve mechanism, a housing, a motor having a shaft connected into the housing, a transverse opening through the housing with which the motor shaft is alined, a rotatable cam member within the transverse opening, a plurality of operated devices radially disposed with respect to said member and adapted to be operated by the same upon its rotation, said transverse opening being adapted to receive the rotary member from one end of said opening, means to prevent axial movement of the rotating member within the opening, a member separable from the rotating member and adapted to be interposed between the motor shaft and the rotating member to transmit rotation of the shaft to the member, and interengaging means between the separable member and the rotating member, being adapted to transmit torque, but being disengageable by axial movement thereof away from the rotating member, a forward and a reverse circuit for the motor, a limit switch operable into two positions to predetermine the direction of rotation of the motor, a cam for operating said limit switch, an element rotatable with the rotating member, and a pin and slot lost motion connection between said element and the cam.

8. In a mechanism of the kind described, a reversible rotary motor means, a rotated member adapted to be operated by the rotary motor means, a pair of actuated devices, operating means angularly spaced around the rotated member, one for each actuated device, limit switch means for controlling the direction of rotation of the motor means, and means on the rotated member for shifting the limit switch means at the time it operates each operating means.

9. In a mechanism of the kind described, a reversible rotary motor means, a rotated member adapted to be operated by the rotary motor means, said rotated member comprising a cam having a cam rise therein, a pair of actuated devices, operating means angularly spaced around the rotated member, one for each actuated device, means urging each operated device yieldingly against the cam, whereby the operated device is shifted when displaced by the cam rise, limit switch means for controlling the direction of rotation of the motor means, and means on the rotated member for shifting the limit switch means at the time it operates each operating means.

10. In a mechanism of the kind described, a reversible rotary motor means, a rotated member adapted to be operated by the rotary motor means, a pair of actuated devices, operating means angularly spaced around the rotated member and movable thereby, one operating means for each actuated device, limit switch means for controlling the direction of rotation of the motor means, including a cam for operating the limit switch means, and a lost motion connection between the rotated member and the cam for moving the cam only when the rotated member moves an operating means.

11. In a mechanism of the kind described, a housing, a main bore therein, a pair of radial bores extending outwardly from the main bore, an actuated device in each radial bore and reciprocable therein toward and from the main bore, an oscillatory member in the main bore, having means thereon to displace the actuated devices selectively upon oscillation thereof from a first position to a second position, reversible power means for oscillating the oscillatory member, switch means for controlling the direction of operation of the power means, and means moved by movement of the oscillatory member for shifting the switch means as the oscillatory member shifts one of the actuated devices.

12. In a valve apparatus, a housing, an inlet thereinto, a first outlet therefrom connected to the inlet, a second outlet therefrom connected to the first outlet, a first valve between the first and second outlets, a third outlet connected to the second outlet, a second valve between the second and third outlets, motor means for operating said valves, mechanism operated by said motor means to shift from a position opening the first valve with the second closed, to a position opening the second valve with the first one closed, and means operated by the motor means to stop operation of the motor means as each valve is operated.

13. In a valve apparatus, a housing, an inlet thereinto, a first outlet therefrom connected to the inlet, a second outlet therefrom connected to the first outlet, a first valve between the first and second outlets, a third outlet connected to the second outlet, a second valve between the second and third outlets, reversible motor means for operating said valves, mechanism operated by said motor means to shift from a position opening the first valve with the second closed, to a position opening the second valve with the first one closed, limit switch means for controlling the direction of operation of the motor means, said switch means being shiftable from a position enabling the motor to operate from opening the first valve and releasing the second, to a position releasing the first valve and opening the second, and means operated by the motor means to shift the limit switch when the mechanism operates to a position opening a valve.

EDWARD G. MILLER.
RALPH E. ENGBERG.

REFERENCES CITED

The following references are of record in the file of this patent:

UNITED STATES PATENTS

| Number | Name | Date |
|---|---|---|
| 1,652,845 | Vennum | Dec. 13, 1927 |
| 1,773,243 | Stewart | Aug. 19, 1930 |
| 1,877,763 | Hazard | Sept. 20, 1932 |
| 1,888,948 | Hazard | Nov. 22, 1932 |
| 1,974,335 | Kimball | Sept. 18, 1934 |
| 1,989,942 | Parks | Feb. 5, 1935 |
| 1,990,090 | Packard | Feb. 5, 1935 |
| 1,999,496 | Adams | Apr. 30, 1935 |
| 2,126,384 | Haines | Aug. 9, 1938 |
| 2,155,271 | Jones | Apr. 18, 1939 |
| 2,178,559 | Cohen | Nov. 7, 1939 |
| 2,240,163 | Pick | Apr. 29, 1941 |
| 2,250,507 | Thomas | July 29, 1941 |
| 2,340,174 | Chance | Jan. 25, 1944 |
| 2,365,140 | Spies | Dec. 12, 1944 |
| 2,397,299 | Strid | Mar. 26, 1946 |

FOREIGN PATENTS

| Number | Country | Date |
|---|---|---|
| 338,948 | France | Dec. 28, 1903 |